UNITED STATES PATENT OFFICE.

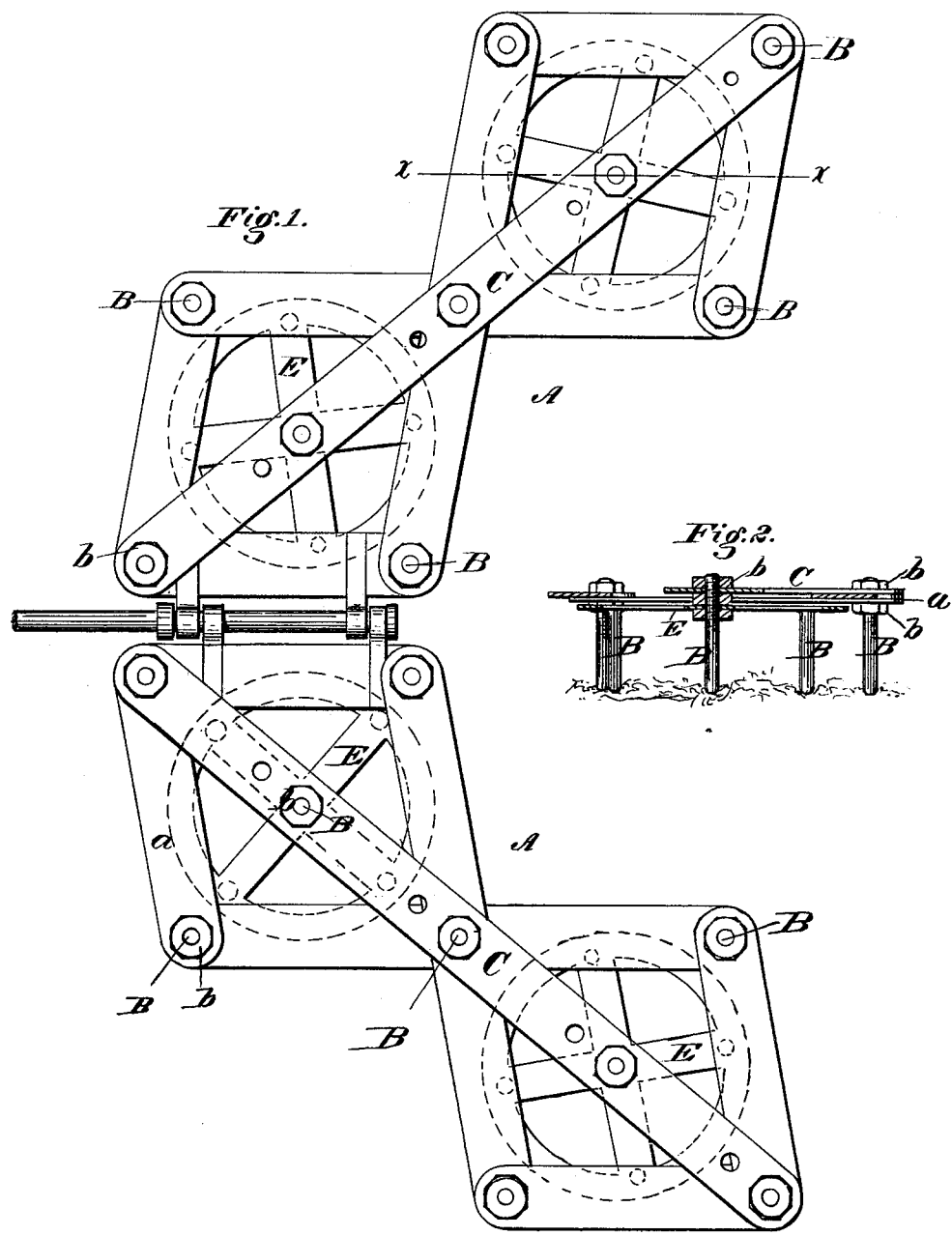

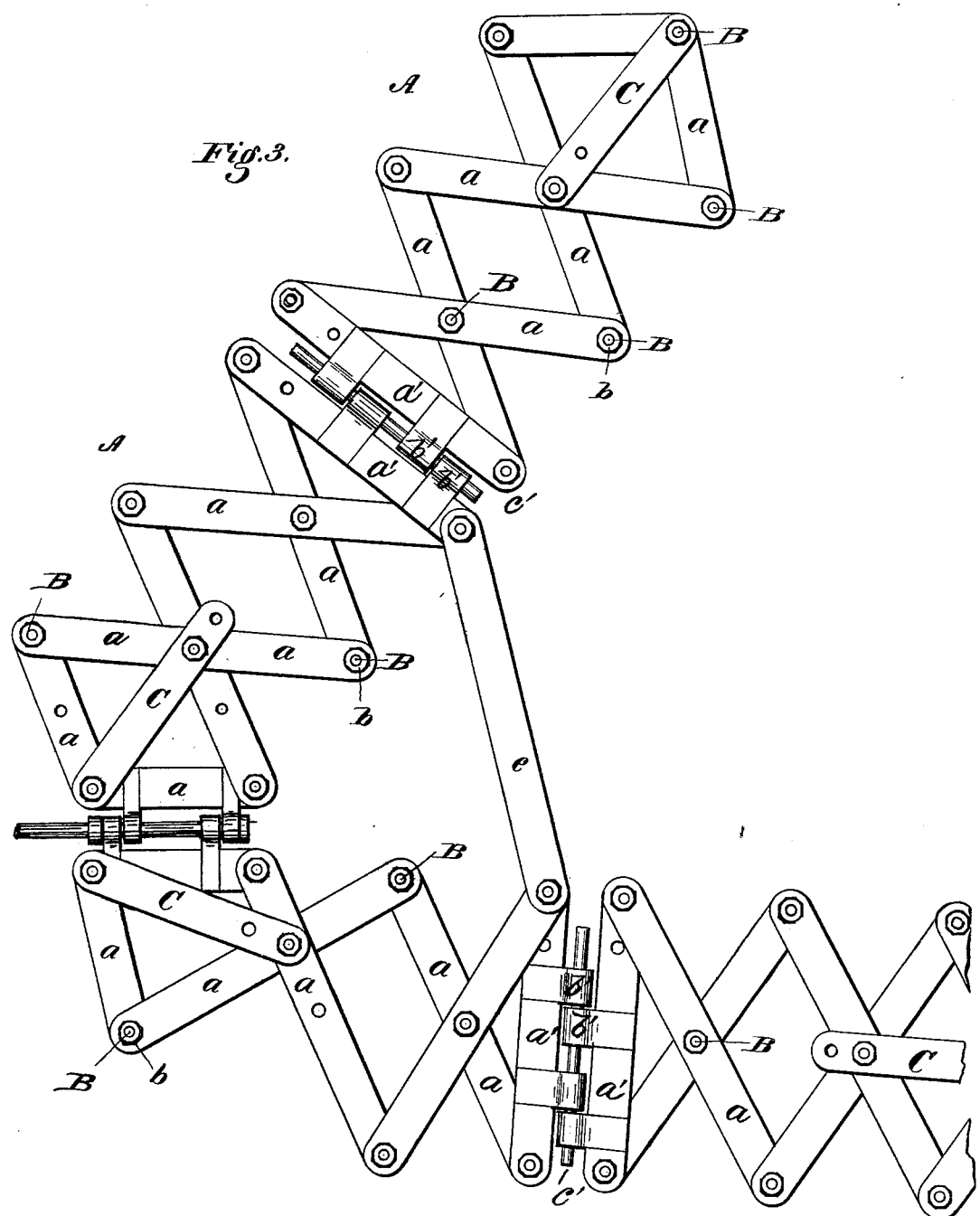

NOAH BURNHAM, OF MENOMONEE, WISCONSIN.

IMPROVEMENT IN HARROWS.

Specification forming part of Letters Patent No. 188,582, dated March 20, 1877; application filed December 15, 1876.

*To all whom it may concern:*

Be it known that I, NOAH BURNHAM, of Menomonee, in the county of Dunn and State of Wisconsin, have invented certain Improvements in Harrows, of which the following is a specification:

My invention consists in a jointed adjustable harrow, the frame of which is composed of a series of bars crossed and pivoted together after the manner of what are commonly known as "lazy-tongs," and in the use of toothed wheels therein.

Figure 1 represents a top plan view of a harrow constructed on my plan, with two sections and rotary toothed wheels; Fig. 2, a cross-section of the same on the line $x\ x$ of Fig. 1; Fig. 3, a plan view of a larger harrow, made in four sections, without the wheels.

In constructing my harrow, I first build two, four, or more sections, A, each consisting of a number of straight metal bars, $a$, crossed and pivoted together after the manner of the common and well known lazy-tongs. The pivots are formed by the upper ends of the harrow-teeth B, which are threaded, passed through the bars $a$, and provided with nuts $b$ above and below the same, as shown in Fig. 2.

The manner in which the bars are arranged admits of their being moved in relation to each other in such manner as to widen or lengthen the sections formed by them, and thereby vary the distance between the teeth of each section, as well as their relative positions.

In order to retain the sections in the required forms, they are each provided with an extra bar or brace, C, connecting two of the teeth or pivots, as shown, the braces being provided, as shown, with two or more holes, to permit the required changes in the form of the sections.

Having provided the sections A, I hinge two of them together in such manner that they have a divergence from each other, and connect to the point of union any suitable device by which to apply the draft.

When a small harrow only is required, two sections will answer all requirements; but when the size requires to be increased, I simply hinge additional sections, one behind another, to the rear ends of the front sections, as shown in Fig. 3.

When the harrow is to be thus elongated and enlarged, the connecting ends of the sections are provided with transverse bars $a'$, having lugs or ears $b'$, to receive the hinge-pins $c'$, by which the sections are united.

When the harrow is of large size, it may be strengthened and stiffened by means of a cross-bar, $e$, connecting the opposite sections, as shown in Fig. 3.

When desired, the sections of the harrow may each be provided with a central rotary toothed wheel, E, in addition to the main teeth, as shown in Fig. 1, the wheels being constructed and arranged to operate in the same manner as in the various harrows now in common use.

The harrow consisting of the sections constructed as shown, and hinged together, is extremely light, cheap, and strong, is capable of adapting itself to the inequalities in the surface of the ground, and may have the arrangement of its teeth varied, as required, with ease and quickness.

I am aware that various harrows composed of jointed bars are old and in use, and also that harrows with rotary toothed wheels are in common use; but Having described my invention, what I claim is—

1. The harrow consisting of the crossed and pivoted bars $a$, the adjustable brace-bars C, and the rotary toothed wheels E, located and arranged as shown and described.

2. A compound flexible and laterally-adjustable harrow, consisting of two front sections, A, hinged together side by side, and two or more rear sections, A, hinged to the rear ends of the front sections in diverging lines, each of said sections consisting, as shown, of crossed and pivoted bars $a$, adjustable brace-bars C, and transverse end bars $a'$, provided with ears $b'$, all as shown and described, so that the form and width of the harrow may be varied at will.

NOAH BURNHAM.

Witnesses:
WILLIAM H. ALLEN,
NATHAN B. NOBLE.